(12) United States Patent
Yamamoto

(10) Patent No.: US 9,083,855 B2
(45) Date of Patent: Jul. 14, 2015

(54) INFORMATION PROCESSING APPARATUS, INFORMATION PROCESSING METHOD, AND STORAGE MEDIUM

(75) Inventor: Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 886 days.

(21) Appl. No.: 13/316,268

(22) Filed: Dec. 9, 2011

(65) Prior Publication Data

US 2012/0154575 A1  Jun. 21, 2012

(30) Foreign Application Priority Data

Dec. 15, 2010 (JP) .................................. 2010-279673

(51) Int. Cl.
*H04N 7/18* (2006.01)
(52) U.S. Cl.
CPC ....................................... *H04N 7/18* (2013.01)
(58) Field of Classification Search
CPC ....................................................... H04N 7/18
USPC .......................................................... 348/135
See application file for complete search history.

(56) References Cited

FOREIGN PATENT DOCUMENTS

| JP | 2007-203406 A | 8/2007 |
|----|---------------|--------|
| JP | 4087874 B2 | 5/2008 |
| JP | 4199264 B2 | 12/2008 |

*Primary Examiner* — Allen Wong
(74) *Attorney, Agent, or Firm* — Canon USA Inc. IP Division

(57) ABSTRACT

An information processing apparatus includes an estimation unit configured to estimate a state of a plurality of objects based on image data obtained by capturing the plurality of object with an imaging unit, a selection unit configured to select an object to be extracted from the plurality of objects based on first state information that indicates the state of the plurality of objects estimated by the estimation unit, and a generation unit configured to, based on second state information that indicates a state of an object other than the selected object among the plurality of objects, generate restriction range information that indicates a range for restricting estimation processing on a state of the other object, wherein the estimation unit estimates the state of the other object based on the restriction range information.

20 Claims, 10 Drawing Sheets

201

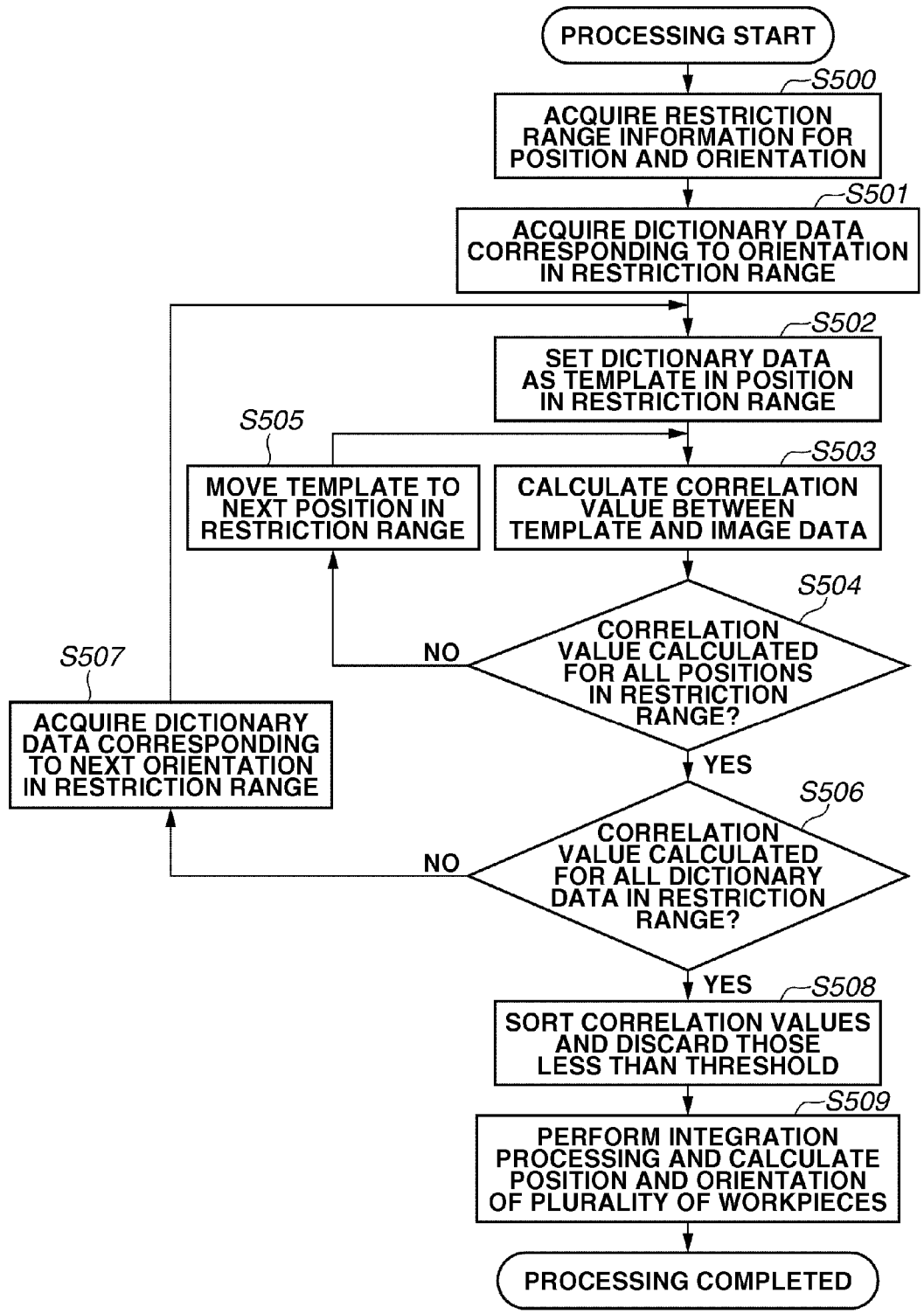

FIG.7A

| WORKPIECE INDEX | ESTIMATED POSITION INFORMATION | | ESTIMATED ORIENTATION INFORMATION | | | SCORE |
|---|---|---|---|---|---|---|
| | HORIZONTAL POSITION: X | VERTICAL POSITION: Y | ROLL ANGLE: α | PITCH ANGLE: β | YAW ANGLE: γ | |
| 0 | X0 | Y0 | α0 | β0 | γ0 | V0 |
| 1 | X1 | Y1 | α1 | β1 | γ1 | V1 |
| 2 | X2 | Y2 | α2 | β2 | γ2 | V2 |
| ... | | | | | | |
| n | Xn | Yn | αn | βn | γn | Vn |

FIG.7B

| WORKPIECE INDEX | ESTIMATED POSITION INFORMATION | | ESTIMATED ORIENTATION INFORMATION | | |
|---|---|---|---|---|---|
| | HORIZONTAL POSITION: X | VERTICAL POSITION: Y | ROLL ANGLE: α | PITCH ANGLE: β | YAW ANGLE: γ |
| 1 | X1 | Y1 | α1 | β1 | γ1 |
| 2 | X2 | Y2 | α2 | β2 | γ2 |
| ... | | | | | |
| n | Xn | Yn | αn | βn | γn |

INFORMATION PROCESSING APPARATUS, INFORMATION PROCESSING METHOD, AND STORAGE MEDIUM

BACKGROUND OF THE INVENTION

1. Field of the Invention

The present invention relates to a technique for extracting piled objects.

2. Description of the Related Art

Japanese Patent Nos. 4087874 and 4199264, for example, discuss techniques for, when extracting piled workpieces in order by capturing an image of the workpieces with a camera, estimating the position and the orientation of each workpiece based on the captured image, and grasping a workpiece with a robot, quickly and correctly estimating the position and the orientation of each workpiece to perform the work.

The technique discussed in Japanese Patent No. 4087874 is directed to improving estimation accuracy by placing a restriction condition on a size estimation to be performed from the next time onward by using an estimation result of the size of the extracted workpiece.

The technique discussed in Japanese Patent No. 4199264 is directed to increasing speed by determining whether a piled state of workpieces has changed due to an extraction operation, and if it is determined that the piled state has not changed around the workpiece to be extracted next, not perform image capturing when extracting the next workpiece.

Thus, to extract workpieces in order from piled workpieces, the position and the orientation of the workpieces have to be estimated. However, from an operation efficiency perspective, the time required for that estimation is desirable to be short.

The technique discussed in Japanese Patent No. 4087874 places a restriction on the size estimation to be performed from the next time onward using a size estimation result of the workpiece extracted this time. Therefore, there needs to be some kind of association between the size of the workpiece extracted this time and the size of the workpiece to be extracted next time.

However, when considering estimation of the position and the orientation of piled workpieces, the relationship between the position and the orientation of a workpiece that is extracted first and the position and the orientation of the workpieces extracted second or later is tenuous. Therefore, it is difficult to employ the technique discussed in Japanese Patent No. 4087874.

Further, the technique discussed in Japanese Patent No. 4199264 does not consider increasing speed when the piled state has changed.

SUMMARY OF THE INVENTION

The present invention is directed to an information processing apparatus and an information processing method, capable of increasing the speed of workpiece estimation processing even when the piled state of the workpieces is changed.

According to an aspect of the present invention, an information processing apparatus includes an estimation unit configured to estimate a state of a plurality of objects based on image data obtained by capturing the plurality of object with an imaging unit, a selection unit configured to select an object to be extracted from the plurality of objects based on first state information that indicates the state of the plurality of objects estimated by the estimation unit, and a generation unit configured to, based on second state information that indicates a state of an object other than the selected object among the plurality of objects, generate restriction range information that indicates a range for restricting estimation processing on a state of the other object, wherein the estimation unit estimates the state of the other object based on the restriction range information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating processing to estimate the position and the orientation of a workpiece.

FIGS. 7A and 7B illustrate an example of a position and orientation estimation result obtained from a workpiece state recognition processing unit and pre-extraction state information input into a restriction range setting unit.

DESCRIPTION OF THE EMBODIMENTS

Various exemplary embodiments, features, and aspects of the invention will be described in detail below with reference to the drawings.

Figure 1:
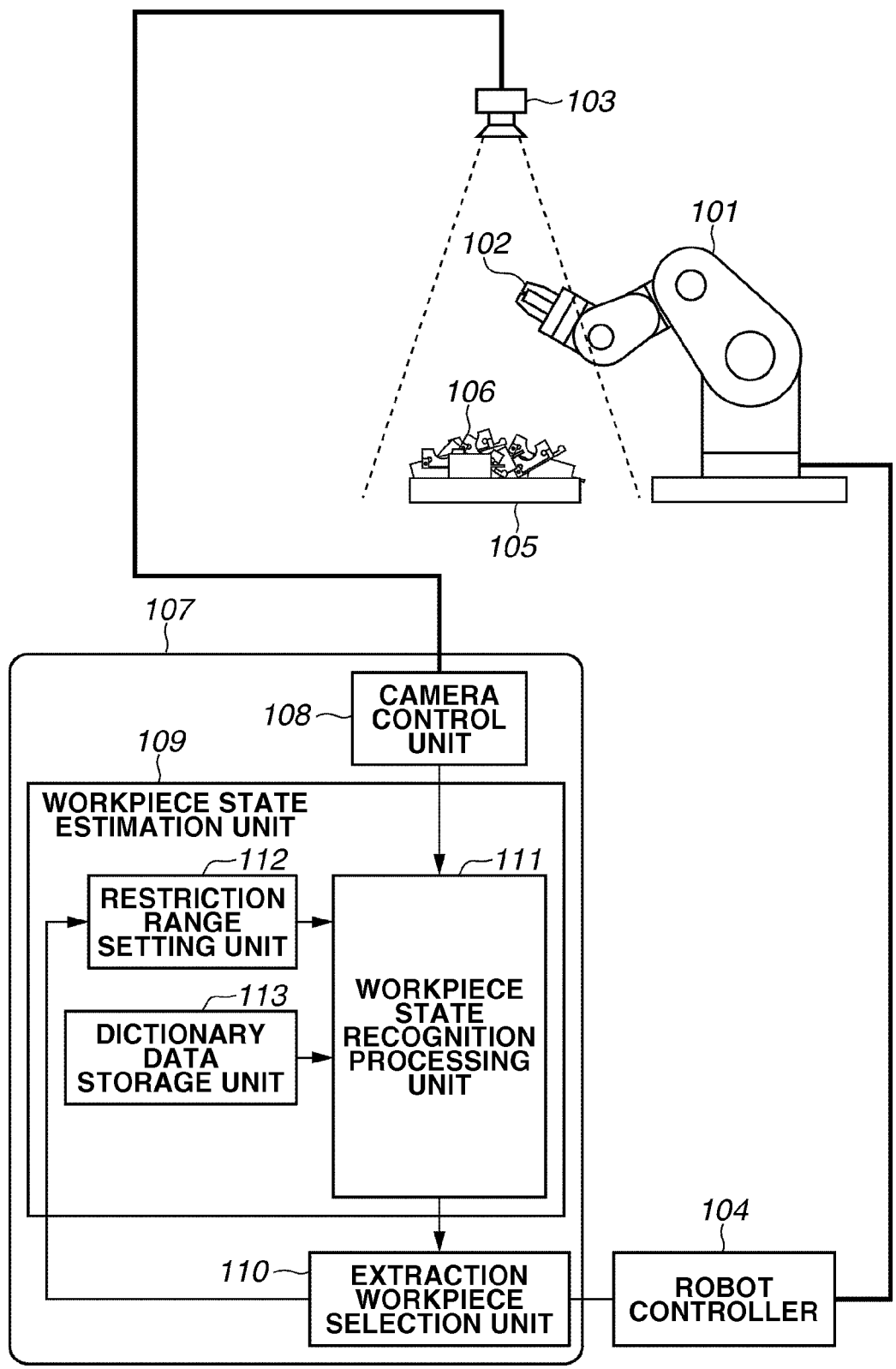
FIG. 1 illustrates a configuration of a workpiece extraction system according to an exemplary embodiment of the present invention.

First, a first exemplary embodiment of the present invention will be described. FIG. 1 illustrates a configuration of a workpiece extraction system according to the first exemplary embodiment of the present invention.

The configuration illustrated in FIG. 1 includes a robot arm 101, a hand mechanism 102 serving as an end effector on the robot arm 101, a workpiece 106 that is a grasping target, and a tray 105. A plurality of workpieces (objects) 106 that is not grasped yet is on the tray 105 in a piled state.

The configuration illustrated in FIG. 1 also includes a camera 103 that is used as an imaging apparatus. The camera 103 is fixedly attached to an upper part of a frame in the system or to the ceiling (not illustrated), for example. The camera 103 can generate image data by capturing the state of the tray 105 and of the plurality of workpieces 106 piled thereon.

A robot controller 104 controls the robot arm 101 and the hand 102 so as to extract a workpiece 106 based on the position and orientation of the workpiece 106 received from an image processing unit 107. Although this robot controller 104 is generally configured from a computer, the present invention is not limited to such a configuration.

The image processing unit 107 is configured from a camera control unit 108, a workpiece state estimation unit 109, and an extraction workpiece selection unit 110. The camera control unit 108 performs control to take in the image data captured by the camera 103.

The workpiece state estimation unit 109 is configured from a workpiece state recognition processing unit 111, a restriction range setting unit 112, and a dictionary data storage unit 113. The workpiece state estimation unit 109 performs the below-described predetermined processing on the image data captured by the camera 103, and estimates the position and the orientation of the plurality of workpieces 106. The image processing unit 107 is configured as an applied example of the information processing apparatus according to the present invention.

The extraction workpiece selection unit 110 determines the workpiece to be extracted this time (target workpiece) by the robot arm 101 based on information about the position and the orientation of each workpiece 106 estimated by the workpiece state estimation unit 109, and transmits that workpiece position and orientation to the robot controller 104.

The method for selecting the workpiece to be extracted is not limited. For example, a workpiece for which the control of the robot controller 104 in order to grasp the workpiece is simple may be selected. Alternatively, a workpiece having a highly reliable position and orientation estimate by the workpiece state estimation unit 109 may be selected.

The dictionary data storage unit 113 associates and stores image data captured from all directions of a sphere surrounding the workpiece with orientation information (the longitude and the latitude of the sphere surrounding the workpiece). However, in actual practice, since image data captured from all directions cannot be continuously prepared, image data of representative orientations obtained by sampling at sufficient degree intervals is stored as dictionary data.

Figure 2:
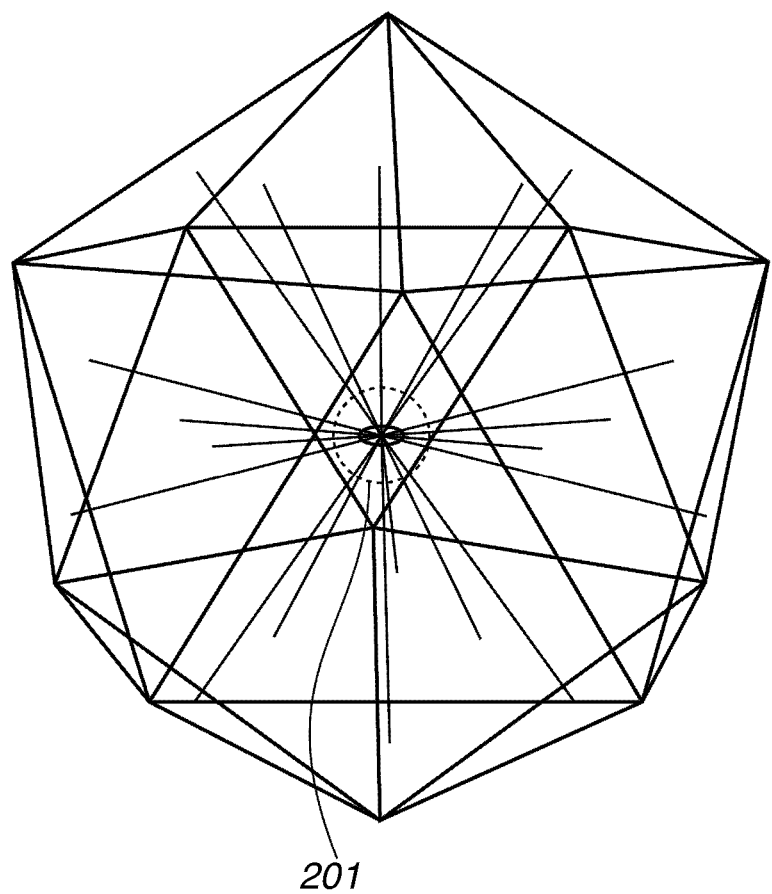
FIG. 2 illustrates a concept called a geodesic dome for illustrating representative orientation.
Figure 3A:
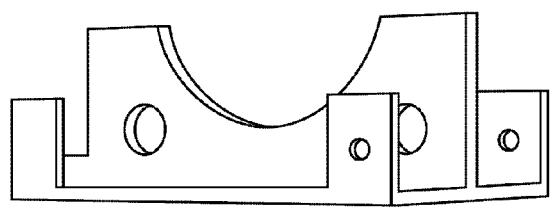
FIGS. 3A to 3E illustrate how a workpiece looks from five representative orientations.
Figure 3B:
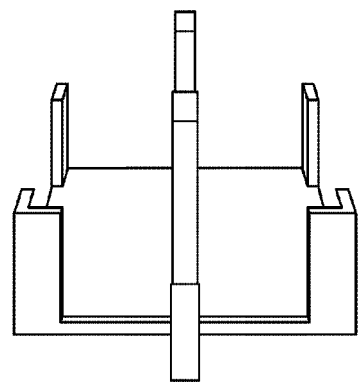
Figure 3C:
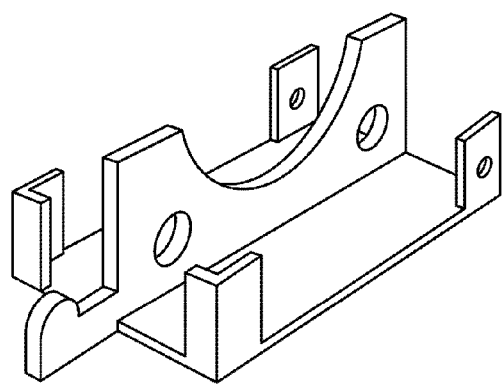
Figure 3D:
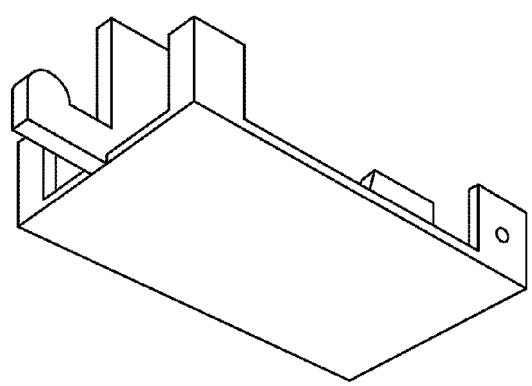
Figure 3E:
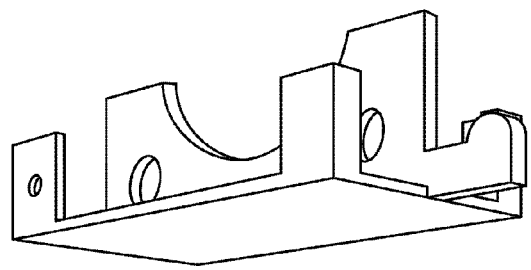

FIG. 2 illustrates a concept called a geodesic dome for illustrating representative orientation. In the present exemplary embodiment, a regular icosahedron serves as the basis of the geodesic dome. The direction from respective representative points on the regular icosahedron when a workpiece 201 is arranged in the center position of the regular icosahedron is defined as the representative orientation.

As the representative points, the respective vertices and the respective face center points maybe used, for example. Since a regular icosahedron has 16 vertices and 20 faces, a total of 36 representative orientations can be defined.

Further, the in-plane rotation with respect to each representative orientation when viewed from that direction needs to be considered. For example, if the in-plane rotation is divided into intervals of 18 degrees, there are 20 in-plane rotation orientations. Therefore, in this case there are 36×20=720 orientations.

FIGS. 3A to 3E illustrate how a workpiece looks from five representative orientations. In such a piled state, the workpiece may be leaning in any direction with respect to the camera 103. Further, the workpiece may have any in-plane rotation in that direction. Therefore, the dictionary data storage unit 113 stores images acquired from all directions (in the present exemplary embodiment, 36 directions) as dictionary data.

Since an in-plane rotation image can be easily generated using affine transformation processing, for example, based on a representative orientation image, it is sufficient to store an images of the workpiece 106 captured from 36 directions in the dictionary data storage unit 113, and generate an in-plane rotation image during the actual processing.

Figure 4A:
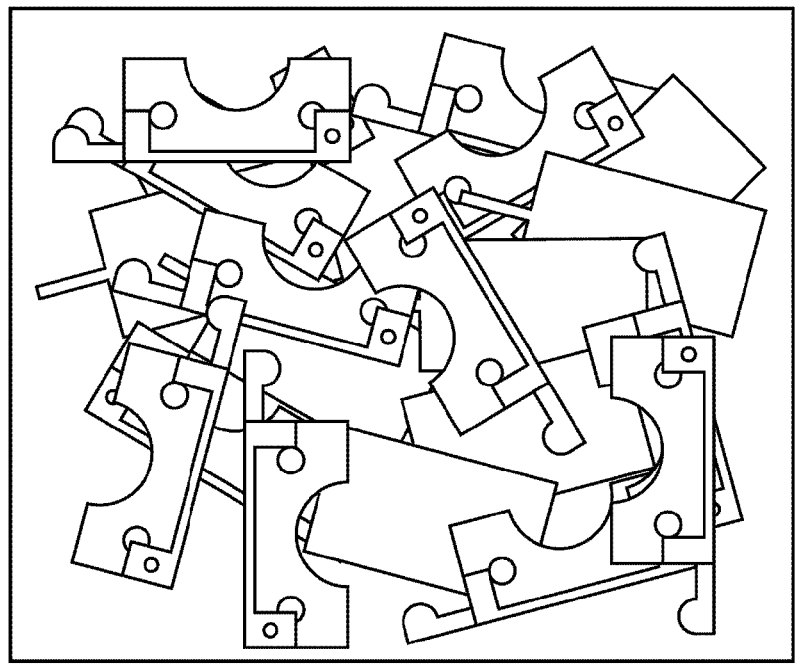
FIGS. 4A and 4B illustrate a method for estimating the position and the orientation of a workpiece.

The workpiece state recognition processing unit 111 receives image data from the camera control unit 108, and estimates the position and the orientation of a workpiece in the image data. FIG. 4A illustrates an example of image data captured by the camera 103. In the image data illustrated in FIG. 4A, a plurality of piled workpieces is captured.

Figure 4B:
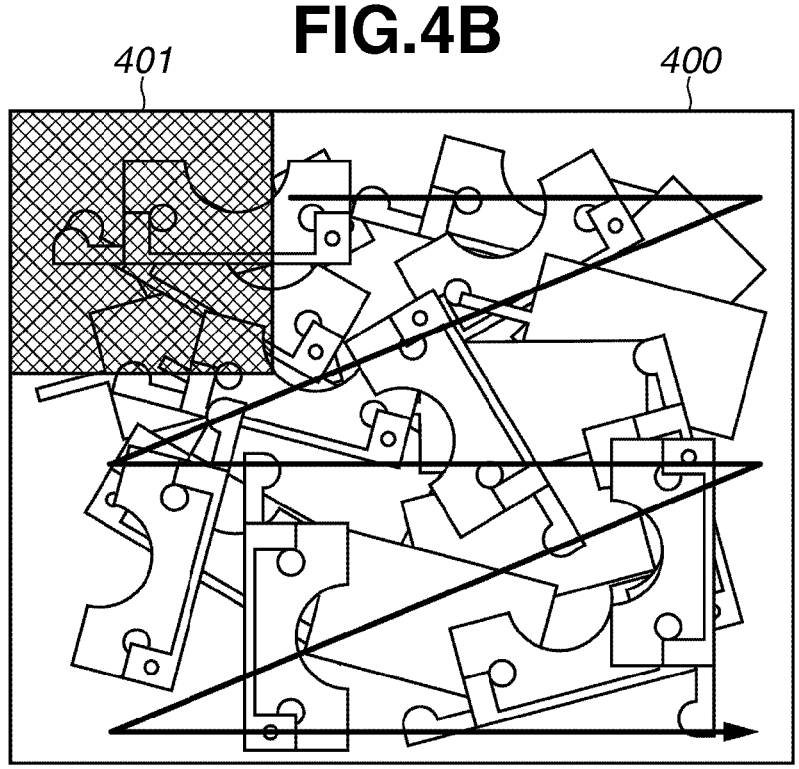

The method for estimating the position and the orientation of a workpiece that is performed by the workpiece state recognition processing unit 111 will now be described referring to FIGS. 4A and 4B, and FIG. 5.

The workpiece state recognition processing unit 111 performs correlation processing on the image data illustrated in FIG. 4A while scanning with the dictionary data stored in the dictionary data storage unit 113 as a template. FIG. 4B illustrates how this looks. The state illustrated in FIG. 4B includes image data 400 and dictionary data (template) 401.

The workpiece state recognition processing unit 111 estimates the position and the orientation of each of the plurality of piled workpieces by performing the processing illustrated in the flowchart of FIG. 5. This processing for estimating the position and the orientation of the workpieces will now be described with reference to FIG. 5.

First, in step S500, the workpiece state recognition processing unit 111 receives restriction range information from the restriction range setting unit 112. At this point, the restriction range information includes the restrictions on the respective processing of the position estimate and the orientation estimate performed by the workpiece state recognition processing unit 111.

For the position estimate, a restriction is placed relating to the position in the image data for setting the dictionary data. For the orientation estimate, a restriction is placed on the dictionary data to be used. The present exemplary embodiment will be described for a case in which the dictionary data corresponding to all orientations in the restriction is applied to all positions in the image data in the restriction.

Figure 6A:
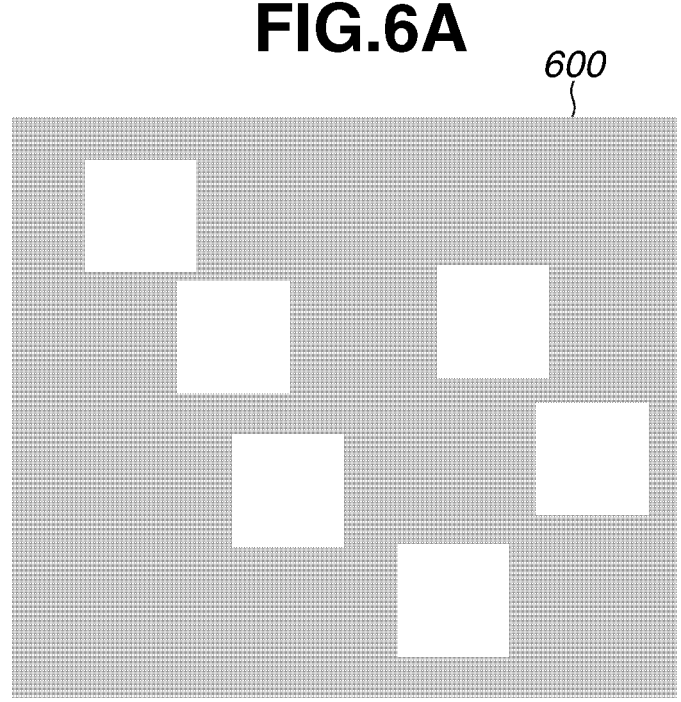
FIGS. 6A and 6B schematically illustrate an example of restriction range information.
Figure 6B:
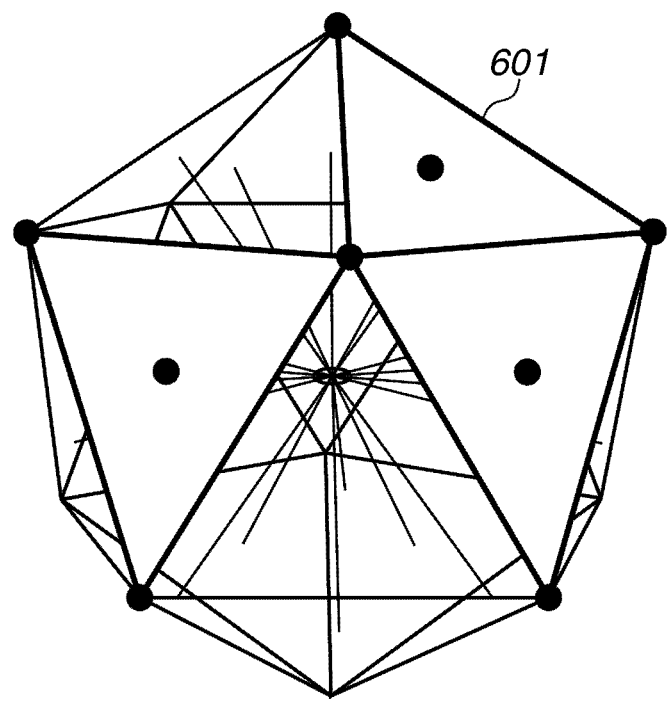

FIGS. 6A and 6B schematically illustrate an example of restriction range information. FIG. 6A schematically illustrates an example of restriction range information relating to the position. Specifically, FIG. 6A illustrates the restriction that in image data 600, the center of the dictionary data can be set only for the portions that are not marked with a dot in the drawing (the white-colored portions).

FIG. 6B schematically illustrates an example of restriction range information relating to orientation. Specifically, FIG. 6B illustrates a geodesic dome 601, which has the restriction that the dictionary data to be used is dictionary data captured from the direction of the portions that are not marked with a dot in the drawing (the white-colored portions). In the present exemplary embodiment, since the respective vertices and the center points of the respective faces serve as the representative points for acquiring the dictionary data, in the example illustrated in FIG. 6B, the orientation is restricted to the dictionary data having a black circle (9 points) in the drawing as a representative point.

In step S501, the workpiece state recognition processing unit 111 acquires from the dictionary data storage unit 113 the dictionary data corresponding to the orientation in the restriction range. For example, if the restriction relating to the orientation is like that illustrated in FIG. 6B, the workpiece state recognition processing unit 111 arbitrarily selects one of the 9 pieces of dictionary data in the restriction, and receives the selected dictionary data from the dictionary data storage unit 113.

In step S502, the workpiece state recognition processing unit 111 sets the dictionary data as a template in a position in the restriction range set in the image data. For example, a template is set in the uppermost left position in the restriction range.

In step S503, the workpiece state recognition processing unit 111 performs a correlation calculation between the template at that position and the image data to calculate a correlation value. In the present invention, since the correlation calculation method is not especially limited, a known method can be used. For example, the correlation value can be calculated based on a normalized correlation calculation.

In step S504, the workpiece state recognition processing unit 111 sets the template in all positions in the restriction range, and checks whether the correlation value has been calculated. If the template has not yet been set in all positions (NO in step S504), the processing proceeds to step S505. If the template has been set in all positions (YES in step S504), the processing proceeds to step S506.

In step S505, the workpiece state recognition processing unit 111 moves the template in the restriction range to the next position. In step S506, the workpiece state recognition processing unit 111 sets all the dictionary data in the restriction range as the template, and checks whether the correlation value has been calculated.

If all the dictionary data has not yet been set as the template (NO in step S506), the processing proceeds to step S507. In step S507, the workpiece state recognition processing unit 111 acquires the dictionary data corresponding to the next orientation in the restriction range. In this case, the dictionary data is updated while also taking into consideration the in-plane rotation in the restriction range. More specifically, new dictionary data may be generated by performing an affine transformation on the dictionary data (template) stored in the dictionary data storage unit 113.

On the other hand, if all the dictionary data in the restriction range (including in-plane rotation) has been set as the template (YES in step S506), the processing proceeds to step S508.

In step S508, the workpiece state recognition processing unit 111 sorts the correlation values obtained up to this point in descending order of size, and performs threshold processing. Specifically, the workpiece state recognition processing unit 111 discards the correlation values that are smaller than the threshold. In step S509, the workpiece state recognition processing unit 111 performs integration processing on the non-discarded correlation values, and calculates the position and the orientation of the plurality of workpieces.

In the present invention, since the integration processing method is not especially limited, a known method can be used. For example, the correlation values of adjacent positions can be grouped together. Further, although in the present exemplary embodiment, the integration processing is performed after the threshold processing, the order in which these processes is performed does not matter. In addition, the two processes may be performed together. Based on the above procedure, the workpiece state recognition processing unit 111 estimates the position and orientation of the plurality of workpieces.

FIGS. 7A and 7B illustrate a result of the position and orientation estimation performed by the workpiece state recognition processing unit 111, and an example of pre-extraction state information input into the restriction range setting unit 112.

FIG. 7A illustrates an example when a position and orientation estimation result for an n+1 workpiece is output. The workpiece state recognition processing unit 111 shows the position information estimated for each workpiece (the horizontal position and the vertical position are referred to below as "estimated position information") and the orientation information estimated for each workpiece (the longitude and the latitude of the geodesic dome and the in-plane rotation angle at that position are referred to below as "estimated orientation information).

In FIG. 7A, the score indicated for each workpiece indicates the integrated correlation value obtained from the above integration processing. The workpiece state recognition processing unit 111 outputs a position and orientation estimation result like that illustrated in FIG. 7A, to the extraction workpiece selection unit 110.

The extraction workpiece selection unit 110 determines the workpiece to be extracted this time (target workpiece) by the robot arm 101 based on the position and orientation estimation result input from the workpiece state recognition processing unit 111. Further, the extraction workpiece selection unit 110 transmits the estimated position information and estimated orientation information for that target workpiece to the robot controller 104.

The workpiece state recognition processing unit 111 also simultaneously sends the estimated position information and estimated orientation information for the workpieces other than the target workpiece as pre-extraction state information to the restriction range setting unit 112. For example, in the position and orientation estimation result illustrated in FIG. 7A, if a workpiece having a workpiece index of 0 is selected as the target workpiece, the estimated position information and estimated orientation information for the workpieces having a workpiece index of 1 to n are the pre-extraction state information (FIG. 7B).

The position and orientation estimation result illustrated in FIG. 7A is an example of first state information, and the pre-extraction state information illustrated in FIG. 7B is an example of second state information.

The restriction range setting unit 112 calculates the restriction range information to be applied in the next position and orientation estimation processing based on the pre-extraction state information input from the extraction workpiece selection unit 110. In the present exemplary embodiment, a predetermined range is set by applying a predetermined variation width to both the estimated position information and the estimated orientation information indicated in the pre-extraction state information, and the information represented by those ranges is used as the restriction range information.

For example, data obtained by applying a variation width p to the estimated position information (X1, Y1), (X2, Y2), . . . (Xn, Yn) in FIG. 7B, and merging the ranges within a circle having a radius p with the position indicated in the respective estimated position information across all the estimated position information is used as the restriction range information relating to position.

Similarly, data obtained by applying a variation width q to the estimated orientation information ($\alpha$1, $\beta$1, $\gamma$1), ($\alpha$2, $\beta$2, $\gamma$2), . . . ($\alpha$n, $\beta$n, $\gamma$n) in FIG. 7B, and merging the ranges within a sphere having a radius q with the orientation indicated in the respective estimated orientation information across all the estimated orientation information is used as the restriction range information relating to orientation.

Using such restriction range information, the processing illustrated in the flowchart of FIG. 5 is executed. Therefore, in the present exemplary embodiment, the dictionary data corresponding to orientation in all the ranges indicated in the restriction range information relating to orientation is applied to the positions in all the ranges indicated in the restriction range information relating to position.

The variation widths p and q are determined based on, for example, the processing time required to estimate the position and the orientation, or a predicted value and an experience value of the estimation accuracy of the position and the orientation. Further, p and q may be increased for regions in which the piled state of the workpieces changes.

Further, in the above, although a predetermined circle is used for the restriction range information relating to position, in the actual processing performed by the workpiece state recognition processing unit 111, it may be easier to perform the processing by performing rectangle restrictions rather than circle restrictions. In this case, a rectangular region that circumscribes a predetermined circle may be used as the restriction range information relating to position. FIG. 6A, which schematically illustrates an example of the restriction range information relating to position, corresponds to such a case.

Moreover, in the above, although a predetermined sphere is used for the restriction range information relating to orientation, like in the present exemplary embodiment, when generating the orientation estimate dictionary data using representative points in a geodesic dome, the dictionary data that is included in a predetermined distance range measured across the geodesic dome may also be used as the restriction range information relating to orientation.

FIG. 6B, which schematically illustrates an example of the restriction range information relating to orientation, corresponds to such a case (however, the restriction range information relating to in-plane rotation is not illustrated).

Figure 8:
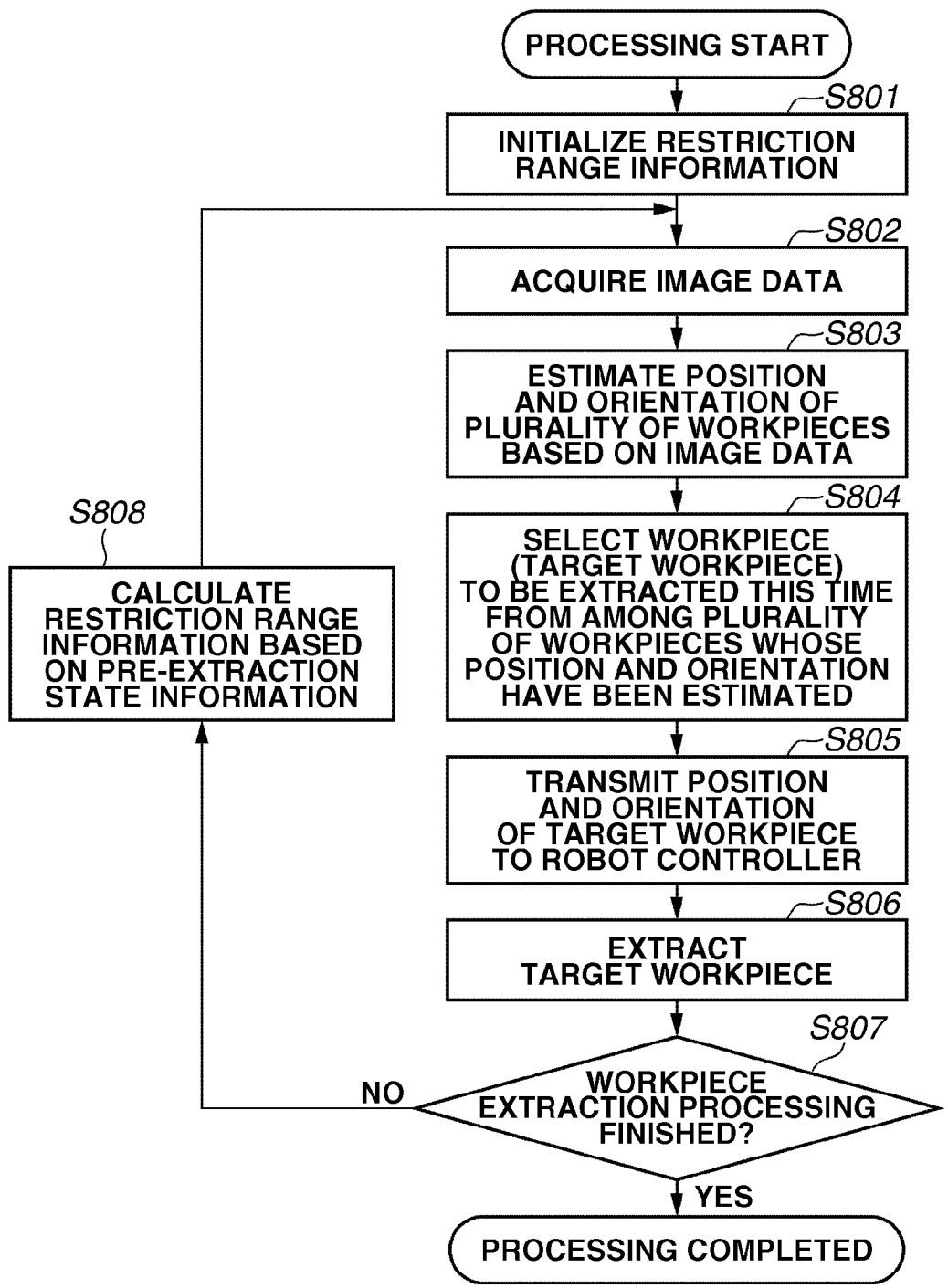
FIG. 8 is a flowchart illustrating operation of the workpiece extraction system according to an exemplary embodiment of the present invention.

Next, operation of the workpiece extraction system according to the present exemplary embodiment will be described referring to the flowchart of FIG. 8.

In step S801, the restriction range setting unit 112 initializes the restriction range information. Initialization of the restriction range information means discarding all restrictions. This is performed because there is no pre-extraction state information present immediately after the extraction processing of the piled workpieces starts, which means that a restriction range cannot be calculated.

Therefore, in the initial position and orientation estimation processing, there is no restriction range information relating to position or restriction range information relating to orientation. Thus, the template is set in all positions in the image data, and all the dictionary data is set as the template.

In step S802, the camera control unit 108 acquires image data including the piled workpiece image. In step S803, the workpiece state estimation unit 109 estimates the position and the orientation of the plurality of workpieces based on the image data input by the camera control unit 108.

In step S804, the extraction workpiece selection unit 110 selects the workpiece to be extracted this time (target workpiece) from among the plurality of workpieces whose position and orientation have been estimated.

In step S805, the extraction workpiece selection unit 110 transmits the estimated position information and the estimated orientation information about the target workpiece to the robot controller 104. In step S806, the robot controller 104 extracts the target workpiece by controlling the robot arm 101 and the hand 102 based on the estimated position information and the estimated orientation information about the target workpiece input from the extraction workpiece selection unit 110.

In step S807, the workpiece state estimation unit 109 determines whether the workpiece extraction processing is finished. This determination is made based on whether a predetermined number of workpieces has been extracted, for example.

If it is determined to continue the workpiece extraction processing (NO in step S807), the processing proceeds to step S808. In step S808, the restriction range setting unit 112 applies a predetermined variation width p to the estimated position information in the pre-extraction state information, and calculates the product of merging all the estimated position information as the restriction range information relating to position.

Further, the restriction range setting unit 112 applies a predetermined variation width q to the estimated orientation information in the pre-extraction state information, and calculates the result of merging all the estimated orientation information as the restriction range information relating to orientation. The calculated restriction range information is set in the workpiece state recognition processing unit 111.

Then, the processing returns to step S802. On the other hand, if it is determined to finish the workpiece extraction processing (YES in step S807), the processing is finished.

Thus, in the present exemplary embodiment, based on the estimated position information and the estimated orientation information for the previous workpiece extraction, a restriction can be applied to the range for performing the estimation in the position and orientation estimation processing this time. Consequently, faster position and orientation estimation processing can be realized.

For example, if the position estimation range is restricted like in FIG. 6A (the white-colored portions are in the restriction range), conventionally the position should be estimated for all data 600. However, in the present exemplary embodiment, since the position is restricted to just the white-colored portions, the processing time is shortened.

Similarly, if the orientation estimation range is restricted like in FIG. 6B, conventionally the orientation should be estimated for all of the dictionary data. However, in the present exemplary embodiment, since the orientation is restricted to just the dictionary data corresponding to the black-circled positions and the in-plane rotation dictionary data generated by subjecting the above dictionary data to an affine transformation, the processing time is shortened. Although not illustrated in FIG. 6B, the in-plane rotation range is also restricted for each black-circled position.

Further, since the estimation of the position and the orientation in this workpiece extraction is not completely skipped, the estimation accuracy is maintained. More specifically, when extracting a predetermined workpiece from among a plurality of piled workpieces, even when the position and the orientation of the other workpieces have slightly changed due to interference for example, the present exemplary embodiment can still be employed without any deterioration in estimation accuracy.

In addition, in the present exemplary embodiment, although an example is described in which the restriction range setting unit 112 calculates the restriction range information relating to both position and orientation, it is not always necessary to calculate the restriction range information for both position and orientation. The restriction range information may be calculated for just the position, or for just the orientation.

Next, a second exemplary embodiment of the present invention will be described. In the first exemplary embodiment, the restriction range information relating to position and the restriction range information relating to orientation are each calculated independently. Therefore, in the first exemplary embodiment, the dictionary data corresponding to the orientation for all ranges indicated in the restriction range information relating to orientation is applied to the positions in all the ranges indicated in the restriction range information relating to position.

In contrast, in the present exemplary embodiment, the position restriction range is set for each estimated position, and the orientation restriction range is set for that position restriction range set for each estimated position. More specifically, in the present exemplary embodiment, since an orientation restriction range is set for each position restriction range, faster processing can be achieved than the first exemplary embodiment.

In the present exemplary embodiment, similar to the first exemplary embodiment, the operation of the restriction range setting unit 112, in which pre-extraction state information like that illustrated in FIG. 7B is input into the restriction range setting unit 112, will be described. Further, in the present exemplary embodiment, the restriction range information is also calculated by applying a predetermined variation width to both the estimated position information and the estimated orientation information indicated in the pre-extraction state information.

The range obtained by applying the predetermined variation width to the respective estimated position information is called a position restriction range. Further, the range obtained by applying the predetermined variation width to the respective estimated orientation information is called an orientation restriction range. For example, position restriction ranges A1, A2, ..., An are calculated for each estimated position information by applying the predetermined variation width to the estimated position information (X1, Y1), (X2, Y2), ... (Xn, Yn) in FIG. 7B.

Similarly, orientation restriction ranges B1, B2, ..., Bn are calculated for each estimated orientation information by applying the predetermined variation width to the estimated orientation information ($\alpha$1, $\beta$1, $\gamma$1), ($\alpha$2, $\beta$2, $\gamma$2), ... ($\alpha$n, $\beta$n, $\gamma$n) in FIG. 7B. Thus, in the restriction range information calculated in the present exemplary embodiment, the position restriction range and the orientation restriction range form a pair.

More specifically, in the position and orientation estimation processing using the restriction range information performed in the present exemplary embodiment, the range for estimating the position is restricted within the position restriction ranges A1, A2, ..., An. In addition, estimation of the orientation performed for the position restriction range A1 is restricted to the orientation restriction range B1.

Similarly, estimation of the orientation performed for the position restriction range A2 is restricted to the orientation restriction range B2 and estimation of the orientation performed for the position restriction range An is restricted to the orientation restriction range Bn.

Similar to the first exemplary embodiment, the variation widths p and q in this case may be determined based on the processing time required to estimate the position and the orientation, or a predicted value and an experience value of the estimation accuracy of the position and the orientation, for example.

Figure 9:
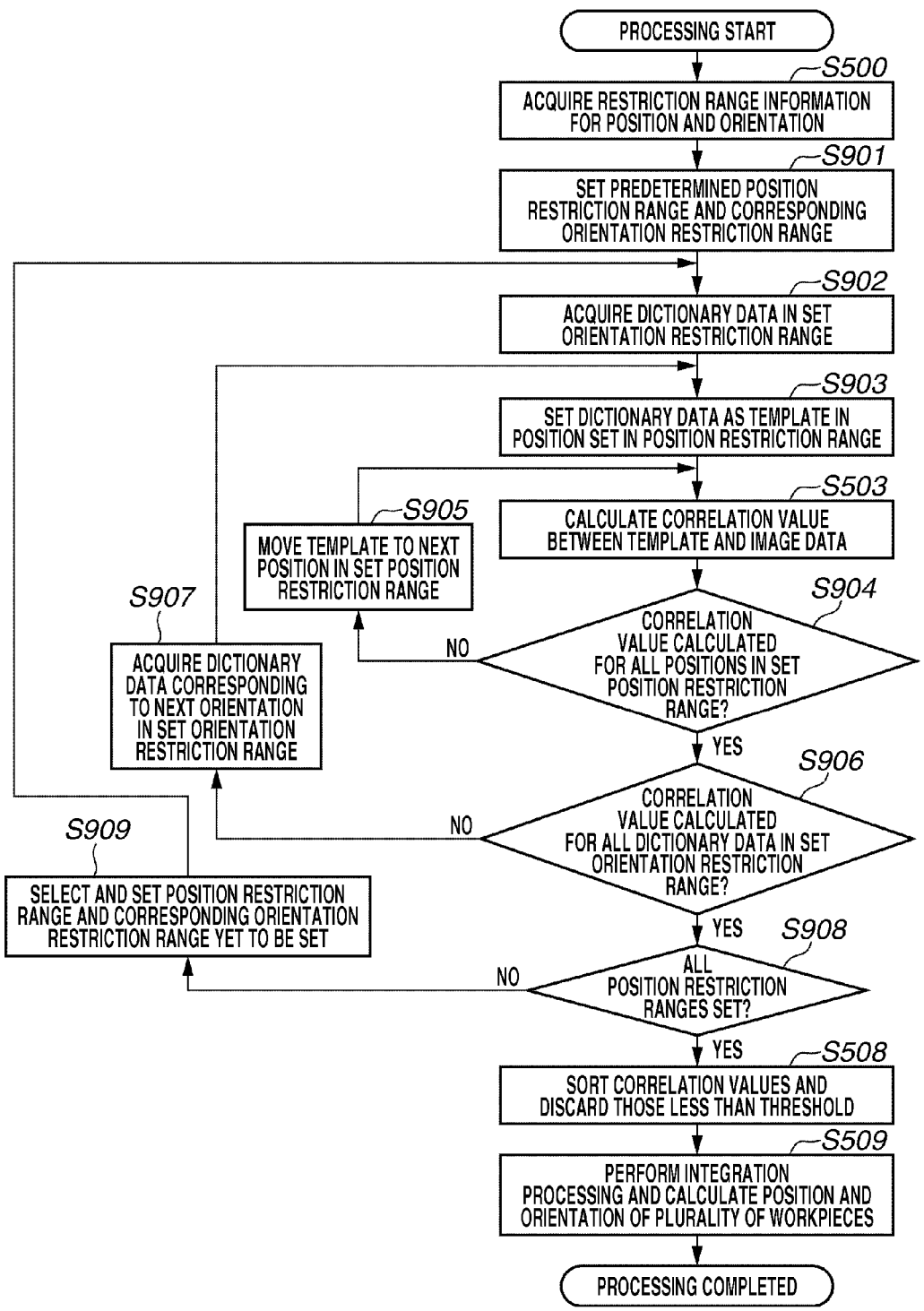
FIG. 9 is a flowchart illustrating processing performed by the workpiece state recognition processing unit when restriction range information is used.

FIG. 9 is a flowchart illustrating the processing performed by the workpiece state recognition processing unit 111 when the above-described restriction range information is used. The steps in FIG. 9 that have the same reference numerals as those in FIG. 5 are the same processing performed in FIG. 5, and thus a description thereof will be omitted here.

In step S901, the workpiece state recognition processing unit 111 selects and sets one position restriction range from among the plurality of position restriction ranges A1, A2, ... An. Further, the workpiece state recognition processing unit 111 also sets the orientation restriction range corresponding to the selected position restriction range. For example, when the workpiece state recognition processing unit 111 selects and sets the position restriction range A1 from among the plurality of position restriction ranges A1, A2, ... An, the workpiece state recognition processing unit 111 then selects and sets the orientation restriction range B1 corresponding to the position restriction range A1.

In step S902, the workpiece state recognition processing unit 111 acquires from the dictionary data storage unit 113 the one piece of dictionary data in the orientation restriction range (e.g., B1) set in step S901 (or step S909).

In step S903, the workpiece state recognition processing unit 111 sets the dictionary data acquired in step S902 (or step S907) as a template in an arbitrary position in the position restriction range (e.g., A1) set in step S901 (or step S909). For example, the workpiece state recognition processing unit 111 sets the template in the uppermost left position in the position restriction range illustrated in FIG. 6A.

In step S904, the workpiece state recognition processing unit 111 sets the template in all positions in the position restriction range, and checks whether the correlation value has been calculated. If the template has not yet been set in all positions (NO in step S904), the processing proceeds to step S905.

On the other hand, if the template has been set in all positions (YES in step S904), the processing proceeds to step S906. In step S905, the workpiece state recognition processing unit 111 moves the template in the position restriction range to the next position. In step S906, the workpiece state recognition processing unit 111 sets all the dictionary data in the orientation restriction range as the template, and checks whether the correlation value has been calculated.

If all the dictionary data has not yet been set as the template (NO in step S906), the processing proceeds to step S907. In step S907, the workpiece state recognition processing unit 111 acquires the dictionary data corresponding to the next orientation in the set orientation restriction range. Similar to the first exemplary embodiment, in this case, the dictionary data is updated while also taking into consideration the in-plane rotation in the restriction range.

On the other hand, if all the dictionary data has been set as the template (YES in step S906), the processing proceeds to step S908. In step S908, the workpiece state recognition processing unit 111 checks whether all of the position restriction ranges (or orientation restriction ranges) have been set.

If all of the position restriction ranges (or orientation restriction ranges) have not yet been set (NO in step S908), the processing proceeds to step S909. In step S909, the workpiece state recognition processing unit 111 selects and sets a position restriction range (and orientation restriction range) that has not yet been set.

On the other hand, if all of the position restriction ranges (or orientation restriction ranges) have been set (YES in step S908), the processing proceeds to step S508.

The workpiece state recognition processing unit 111 according to the present exemplary embodiment estimates the positions and the orientations of a plurality of workpieces based on the above procedure. In the first exemplary embodiment, the position and orientation estimate is performed using a common orientation restriction range for all of the position restriction ranges. However, in the present exemplary embodiment, an orientation restriction range is specified for each position restriction range. Therefore, in the present exemplary embodiment, the position and orientation of the workpiece can be estimated even faster than in the first exemplary embodiment.

Next, a third exemplary embodiment of the present invention will be described. In the first and second exemplary embodiments, the variation width used when calculating the restriction range information is determined regardless of the position of the extracted workpiece (target workpiece). However, in the present exemplary embodiment, an example is described in which the variation width is determined based on a distance from the position where the target workpiece was placed.

Like in the first exemplary embodiment, in the third exemplary embodiment, a case is also described in which position and orientation estimation is performed as illustrated in FIG. 7A by the workpiece state recognition processing unit 111.

In addition, a case will be described in which a workpiece having a workpiece index of 0 is selected by the extraction workpiece selection unit 110 as the workpiece to be extracted this time (target workpiece), and the target workpiece is extracted by the robot arm 101 and the hand 102.

To simplify the description, as viewed from position (X0, Y0) of the workpiece having a workpiece index of 0, the workpieces are arranged in order of closeness as follows: the workpiece having a workpiece index of 1, the workpiece having a workpiece index of 2, ... the workpiece having a workpiece index of n etc.

In the present exemplary embodiment, the extraction workpiece selection unit 110 not only transfers the pre-extraction state information to the restriction range setting unit 112, but also transfers the position information (X0, Y0) about the target workpiece.

In the present exemplary embodiment, the restriction range setting unit 112 applies a predetermined variation width based on an estimated position in the pre-extraction state information (e.g., (X1, Y1)) and on the distance to the target workpiece position (X0, Y0). In the present exemplary embodiment, the closer the distance between the estimated position and the target workpiece is, the greater the applied variation width is. Therefore, for example, by applying a variation width p1, p2, ... pn to the estimated position (X1, Y1), (X2,Y2), ... (Xn, Yn), respectively, p1 is the maximum variation width, and pn is the minimum variation width.

Thus, the reason for changing the variation width based on the distance from the position where the target workpiece was located is because consideration is given to the fact that some other workpiece (a workpiece other than the target workpiece) may interfere with the hand 102 during extraction of the target workpiece. Further, another reason is that the piled workpieces may collapse due to extraction.

The chances of interference during extraction are higher the closer a workpiece is to the target workpiece. Further, the effects when interference actually happens can be expected to be greater the closer a workpiece is to the target workpiece. In addition, the closer a workpiece is to the target workpiece, the more likely it is that the piled workpieces will collapse. Therefore, by setting a greater variation width the closer a workpiece is to the target workpiece, the position and orientation can be estimated even if interference or collapsing occurs.

Further, the variation width may also be changed based on the type of workpieces that are piled. This allows a variation width to be set by considering how susceptible a workpiece is to interference or how susceptible the piled workpieces are to collapsing based on workpiece shape.

For example, as the piled workpieces, a greater variation width may be set for workpieces having a complex shape which frequently causes interference, so that such workpieces can be extracted even if the position and orientation greatly change due to interference. Similarly, even for workpieces having an unstable shape which frequently collapse, such workpieces can be extracted by setting a greater variation width.

Next, a fourth exemplary embodiment will be described. In the first to third exemplary embodiments, initialization (discard of all restrictions) of the restriction range information by the restriction range setting unit 112 is only performed immediately after the piled workpiece extraction processing is started. However, the present invention is not limited to this.

For example, the restriction range information can be periodically initialized. In the fourth exemplary embodiment, an example is described in which the number of workpiece extractions after initialization of the restriction range information (hereinafter, "post-initialization extraction number") is measured, and the restriction range information is re-initialized when the post-initialization extraction number reaches a predetermined number.

Figure 10:
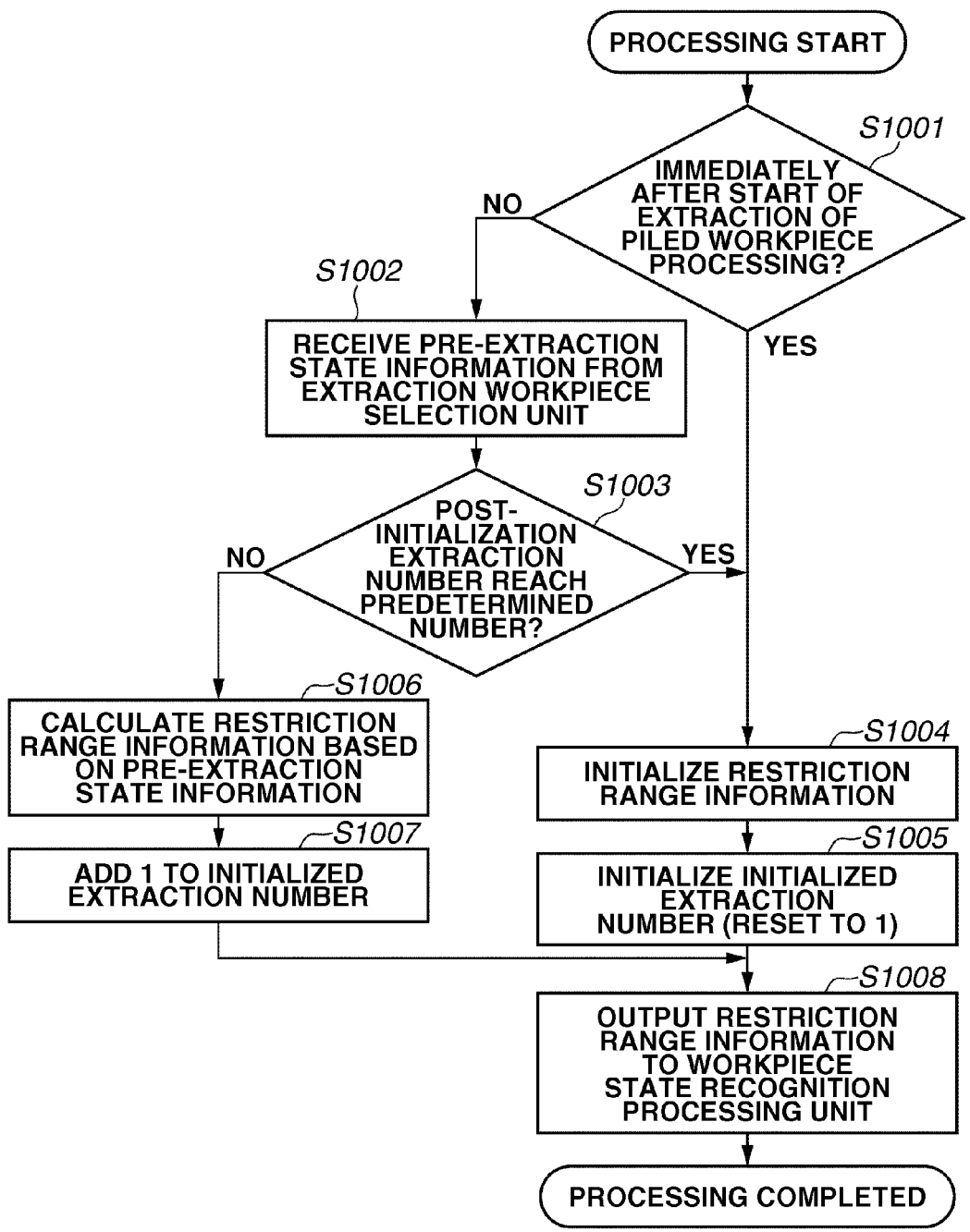
FIG. 10 is a flowchart illustrating operation of the restriction range setting unit according to an exemplary embodiment of the present invention.

FIG. 10 is a flowchart illustrating operation of the restriction range setting unit according to the fourth exemplary embodiment. The operation of the restriction range setting unit 112 according to the present exemplary embodiment will now be described with reference to FIG. 10.

In step S1001, the restriction range setting unit 112 checks whether the extraction processing of the piled workpieces has just started. If the extraction processing of the piled workpieces has just started (YES in step S1001), the processing proceeds to step S1004. In step S1004, the restriction range setting unit 112 initializes the restriction range information. Then, in step S1005, the restriction range setting unit 112 initializes (resets to 1) the post-initialization extraction number.

On the other hand, if the extraction processing of the piled workpieces has not just started (NO in step S1001), the processing proceeds to step S1002. In step S1002, the restriction range setting unit 112 receives pre-extraction state information from the extraction workpiece selection unit 110. Then, the processing proceeds to step S1003.

In step S1003, the restriction range setting unit 112 checks whether the post-initialization extraction number has reached a predetermined number. If the post-initialization extraction number has reached the predetermined number (YES in step S1003), the processing proceeds to step S1004. On the other hand, if the post-initialization extraction number has not reached the predetermined number (NO in step S1003), the processing proceeds to step S1006.

In step S1006, the restriction range setting unit 112 calculates the restriction range information based on the pre-extraction state information. This restriction range information calculation processing is the same as those in the first to third exemplary embodiments.

In step S1007, the restriction range setting unit 112 adds 1 to the post-initialization extraction number. In step S1008, the restriction range setting unit 112 outputs the restriction range information to the workpiece state recognition processing unit 111.

The number of workpieces indicated in the pre-extraction state information would usually be expected to decrease each time a workpiece is extracted. However, like in the present exemplary embodiment, the number of workpieces indicated in the restriction range information periodically increases due to the periodic initialization of the restriction range information. This broadens the choices for the extraction workpiece by the extraction workpiece selection unit 110.

Consequently, the choices for workpieces that are easily controlled by the robot controller 104, for example, can be increased by the extraction workpiece selection unit 110. Alternatively, the choices for workpieces that have a high degree of estimation reliability by the workpiece state estimation unit 109 can be increased.

Further, although an example is described above in which the post-initialization extraction number is measured and the restriction range information is initialized if the post-initialization extraction number has reached a predetermined number, the restriction range information may be initialized when the number of workpieces indicated by the pre-extraction state information has reached a predetermined number. Consequently, a decrease in the number of extraction workpiece choices due to a decrease in the number of workpieces indicated in the pre-extraction state information can be prevented.

Further, the relationship between the post-initialization extraction number and the variation width used when calculating the restriction range information may be set so that, for example, the variation width increases as the post-initialization extraction number increases.

By increasing the variation width, the number of workpieces whose position and orientation can be estimated should increase. Consequently, a decrease in the number of extraction workpiece choices due to a decrease in the number of workpieces indicated in the pre-extraction state information can be prevented.

In addition, the above-described predetermined number may be set as follows. For example, the predetermined number may be set based on the type of piled workpiece. This allows the extraction number to be set by considering how susceptible a workpiece is to interference or how susceptible the piled workpieces are to collapsing based on workpiece shape. For workpieces whose position or orientation tends to change, it is better to initialize the restriction range information frequently to some extent.

Further, the predetermined number may also be set based on the degree of change between the position and orientation estimation result for during the previous extraction and the position and orientation estimation result estimated for this time. Alternatively, initialization may be performed when the degree of change between the position and orientation estimation result for during the previous extraction and the position and orientation estimation result estimated for this time exceeds a predetermined threshold.

Next, a fifth exemplary embodiment will be described. In the first to fourth exemplary embodiments, a method is described which only uses pre-extraction state information to calculate the restriction range information by the restriction range setting unit 112. However, the present invention is not limited to this.

For example, the present invention also includes cases that perform image capturing even after a workpiece has been extracted, estimate the change in the piled state before and after workpiece extraction, and calculate the restriction range information also using that estimation result.

Changes in the workpiece piled state can be estimated by capturing an image before and after workpiece extraction and calculating a difference image between the two images. If there is a difference other than the position of the extracted workpiece, this means that a change in the piled state has occurred (e.g., the pile of workpieces has collapsed when extracting the workpiece, or the orientation of the workpiece has changed due to the hand touching it etc.).

The amount of change in the piled state can be estimated based on, for example, the area of a non-zero region after performing threshold processing on the difference image.

The restriction range information can also be calculated by setting the variation width based on the thus-estimated amount of change in the piled state. For example, if the estimated position information for a predetermined workpiece in the pre-extraction state information is included in a place estimated to have a large change in the piled state, the variation width to be applied on that estimated position information and corresponding estimated orientation information may be increased.

Conversely, if the estimated position information for a predetermined workpiece in the pre-extraction state information is included in a place estimated to have a small change in the piled state, the variation width to be applied on that estimated position information and corresponding estimated orientation information may be decreased.

In the above-described exemplary embodiments, although the position of the workpiece estimated by the workpiece state recognition processing unit 111 is described using two dimensions, the present invention is not limited to this.

More specifically, a three-dimensional position of the workpiece can be estimated. Estimation of the workpiece three-dimensional position may be performed by converting the estimated position information in the pre-extraction state information into three dimensions, and also converting the restriction range information relating to the position into three dimensions. In this case, if necessary, a camera that can also acquire distance information may be used as the camera 103.

Further, in the above-described exemplary embodiments, although correlation processing using a template prepared for each orientation is described as the method for estimating the position and orientation performed by the workpiece state recognition processing unit 111, the workpiece extraction method according to the present invention is not limited to this. For example, the position and the orientation can also be estimated by employing an orientation estimation method that uses a decision tree while sliding across the position in the image.

In this case, a decision tree corresponding to the restricted orientation range can be prepared by preparing a plurality of learning data sets in which the restricted orientation is varied, and making the decision tree learn from the respective learning data sets. The decision tree that corresponds to the restriction range information received from the restriction range setting unit 112 can be selected from among the prepared plurality of learning decision trees.

Further, in the above exemplary embodiments, although the restriction range information is calculated by applying a predetermined variation width on pre-extraction state information, the method for determining what value to actually set that variation width to is not limited. For example, the optimum value may be found by performing several experiments while changing the value. In addition, this value may be determined based on, for example, the processing time required to estimate the position and the orientation, or a predicted value and an experience value of the estimation accuracy of the position and the orientation.

Although the image processing unit 107 is configured from a typical computer, in the present invention, the configuration is not limited. Further, the image processing unit 107 may be integrated with the robot controller 104.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-279673 filed Dec. 15, 2010, which is hereby incorporated by reference herein in its entirety.

What is claimed is:

1. An information processing apparatus comprising:
an estimation unit configured to estimate a state of a plurality of objects based on image data obtained by capturing the plurality of object with an imaging unit;
a selection unit configured to select an object to be extracted from the plurality of objects based on first state information that indicates the state of the plurality of objects estimated by the estimation unit; and
a generation unit configured to, based on second state information that indicates a state of an object other than the selected object among the plurality of objects, generate restriction range information that indicates a range for restricting estimation processing on a state of the other object,
wherein the estimation unit estimates the state of the other object based on the restriction range information.

2. The information processing apparatus according to claim 1, wherein the generation unit generates the restriction range information by applying a predetermined variation width to the second state information.

3. The information processing apparatus according to claim 2, wherein the second state information indicates at least one of the position and the orientation of the other object.

4. The information processing apparatus according to claim 3, wherein the generation unit calculates as the restriction range information a position restriction range that indicates a restriction range relating to estimation processing of the position of the other object by applying the predetermined variation width to the position of the other object indicated in the second state information, and
wherein the estimation unit estimates the position of the other object within the position restriction range.

5. The information processing apparatus according to claim 3, wherein the generation unit calculates as the restriction range information an orientation restriction range that indicates a restriction range relating to estimation processing of the orientation of the other object by applying the predetermined variation width to the orientation of the other object indicated in the second state information, and
wherein the estimation unit estimates the orientation of the other object within the orientation restriction range.

6. The information processing apparatus according to claim 3, wherein the generation unit calculates a position restriction range that indicates a restriction range relating to estimation processing of the position of the other object by applying the predetermined variation width to the position of the other object indicated in the second state information, and calculates an orientation restriction range that indicates a restriction range relating to estimation processing of the orientation of the other object by applying the predetermined variation width to the orientation of the other object indicated in the second state information, and
wherein the estimation unit estimates the position of the other object within the position restriction range based on the restriction range information including the position restriction range and the orientation restriction range, and estimates the orientation of the other object within the orientation restriction range corresponding to the position restriction range.

7. The information processing apparatus according to claim 2, wherein the predetermined variation width is determined based on a distance from the position of the selected object to the position estimated for the other object by the estimation unit.

8. The information processing apparatus according to claim 7, wherein the generation unit, as the predetermined variation width, applies a greater variation width the closer the distance from the position of the selected object to the position estimated for the other object by the estimation unit.

9. The information processing apparatus according to claim 2, wherein the variation width is determined based on object type.

10. The information processing apparatus according to claim 2, wherein the predetermined variation width is determined based on a difference between image data captured from the plurality of objects and image data captured from the other object after the object was extracted.

11. The information processing apparatus according to claim 1, further comprising an initialization unit configured to initialize the restriction range information when an object extraction number reaches a predetermined number.

12. The information processing apparatus according to claim 11, wherein the predetermined number is determined based on the type of the plurality of objects.

13. The information processing apparatus according to claim 11, wherein the predetermined number is determined based on a degree of change between an estimation result of a state of the plurality of objects performed by the estimation unit and an estimation result of the state of the other object performed by the estimation unit.

14. The information processing apparatus according to claim 11, wherein the predetermined variation width is determined based on the object extraction number after initialization of the restriction range information by the initialization unit.

15. The information processing apparatus according to claim 14, wherein the predetermined variation width is determined to be greater, as the object extraction number after initialization of the restriction range information is greater.

16. The information processing apparatus according to claim 1, further comprising an initialization unit configured to initialize the restriction range information when a number of the other objects after object extraction reaches a predetermined number.

17. The information processing apparatus according to claim 1, further comprising an initialization unit configured to initialize the restriction range information when a degree of change between an estimation result of a state of the plurality of objects performed by the estimation unit and an estimation result of the state of the other object based on the restriction range information performed by the estimation unit exceeds a predetermined threshold.

18. The information processing apparatus according to claim 1, wherein the generation unit generates the restriction range information based on a difference between image data captured from the plurality of objects and image data captured from the other object after the object was extracted.

19. A method executed by an information processing apparatus comprising:
   estimating a state of a plurality of objects based on image data obtained by capturing the plurality of object by an imaging unit;
   selecting an object to be extracted from the plurality of objects based on first state information that indicates the estimated state of the plurality of objects; and
   generating, based on second state information that indicates a state of an object other than the object among the plurality of objects, restriction range information that indicates a range for restricting estimation processing performed on a state of the other object,
   wherein the estimation of the state of the other object is performed based on the restriction range information.

20. A non-transitory computer readable storage medium storing computer-executable instructions for controlling an information processing apparatus, which, when executed by a computer, cause the computer to perform a method comprising:
   estimating a state of a plurality of objects based on image data obtained by capturing the plurality of object by an imaging unit;
   selecting an object to be extracted from the plurality of objects based on first state information that indicates the estimated state of the plurality of objects; and
   generating, based on second state information that indicates a state of an object other than the object among the plurality of objects, restriction range information that indicates a range for restricting estimation processing performed on a state of the other object,
   wherein the estimation of the state of the other object is performed based on the restriction range information.

* * * * *